US005816636A

United States Patent [19]
Gibson et al.

[11] Patent Number: 5,816,636
[45] Date of Patent: Oct. 6, 1998

[54] SELF-RELEASING LOG CHOKER

[76] Inventors: Daniel R. Gibson, 502 E. Lennox, Yreka, Calif. 96097; Burt M. Kellogg, 770 8th St., Montague, Calif. 96064

[21] Appl. No.: 881,550

[22] Filed: Jun. 24, 1997

[51] Int. Cl.⁶ .................................................... B66C 1/38
[52] U.S. Cl. ...................... 294/82.14; 294/75; 294/82.32
[58] Field of Search .............................. 294/74, 75, 82.13, 294/82.14, 82.24, 82.31, 82.32, 82.33, 82.34, 110.1, 118

[56] References Cited

U.S. PATENT DOCUMENTS

| | | |
|---|---|---|
| 1,426,563 | 8/1922 | Gariglio . |
| 1,720,069 | 7/1929 | Yeaton . |
| 2,872,716 | 2/1959 | Ehmann et al. . |
| 3,081,122 | 3/1963 | Jungersen . |
| 3,163,401 | 12/1964 | Johnston et al. . |
| 3,239,900 | 3/1966 | Bottoms . |
| 3,239,901 | 3/1966 | Hagenbook . |
| 3,323,185 | 6/1967 | Maras . |
| 3,633,960 | 1/1972 | Drayton . |
| 3,945,092 | 3/1976 | Andrews . |
| 4,358,144 | 11/1982 | Schmidt et al. . |
| 4,417,758 | 11/1983 | Vaders . |
| 4,637,643 | 1/1987 | Johnson et al. . |
| 4,709,952 | 12/1987 | Selby . |
| 4,762,356 | 8/1988 | Robins . |
| 4,817,929 | 4/1989 | Kozak . |
| 5,064,235 | 11/1991 | Lessard . |
| 5,597,191 | 1/1997 | McPhee et al. . |

*Primary Examiner*—Dean Kramer
*Attorney, Agent, or Firm*—Robert L. Harrington

[57] ABSTRACT

A self releasing connector for a log choker has double ended jaws that are pivotally movable between an open and a closed position. A biasing spring urges the jaws to normally open position. With jaws open an end of choker cable is insertable and the jaws are closed to retain the end of the choker. A holder is slidably movable to retain the jaws in the closed position. The choker cable is extended through eyelets on the opposite ends of the jaws. Tension applied to the choker cable will force further closing of the jaws and the holder is released. Upon release of the tension on the choker cable the spring urges the jaws open to release the end of the choker cable. An auxiliary lock may be provided to maintain the holder in position to maintain the jaws in the locked position.

6 Claims, 5 Drawing Sheets

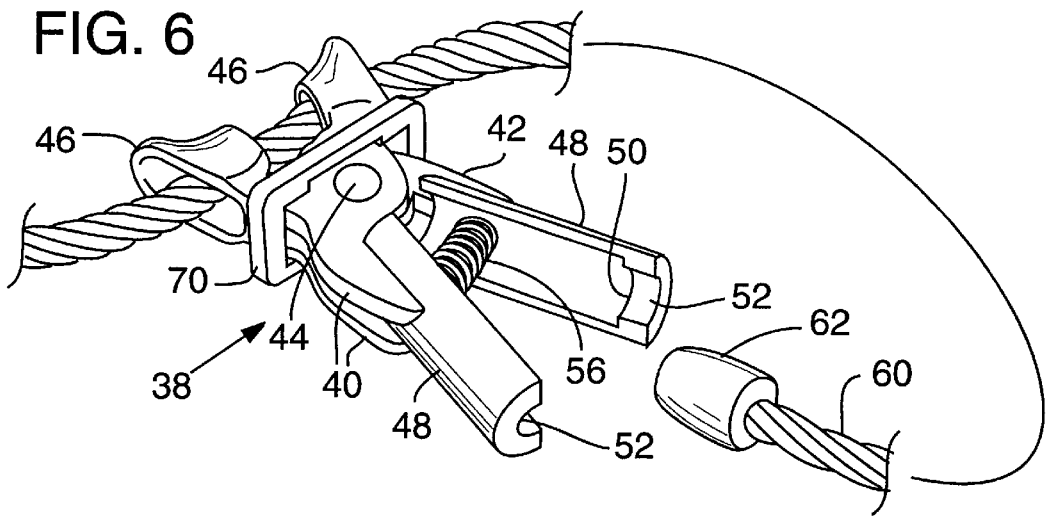
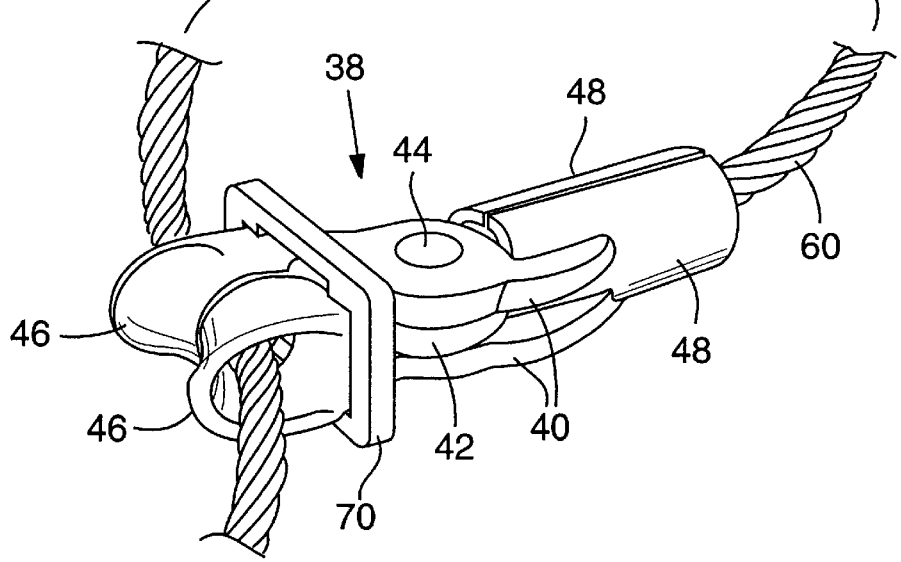
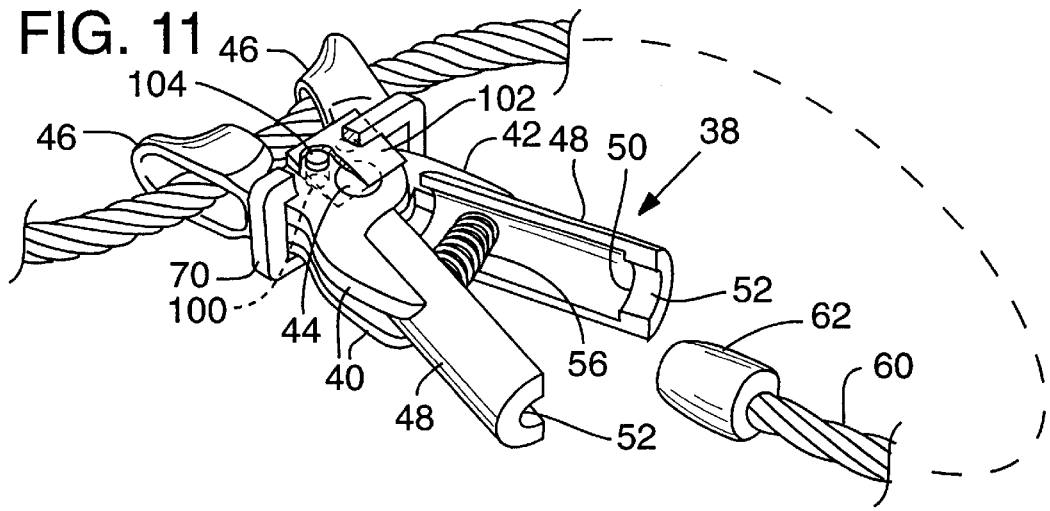

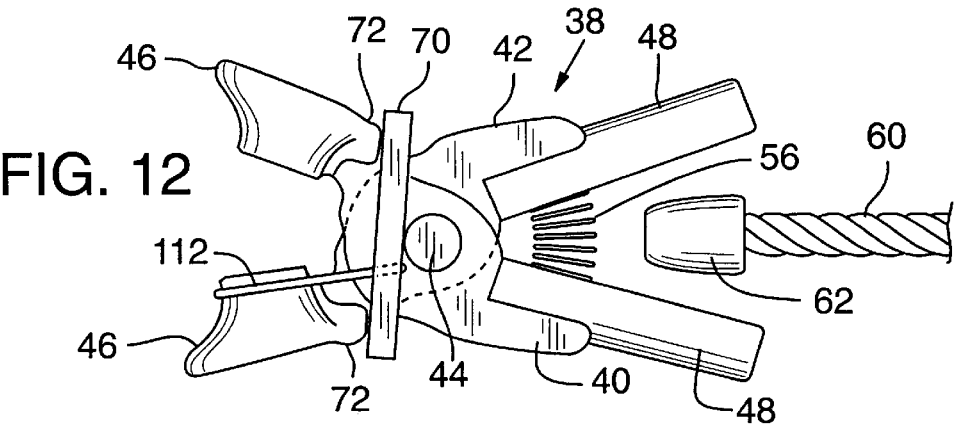
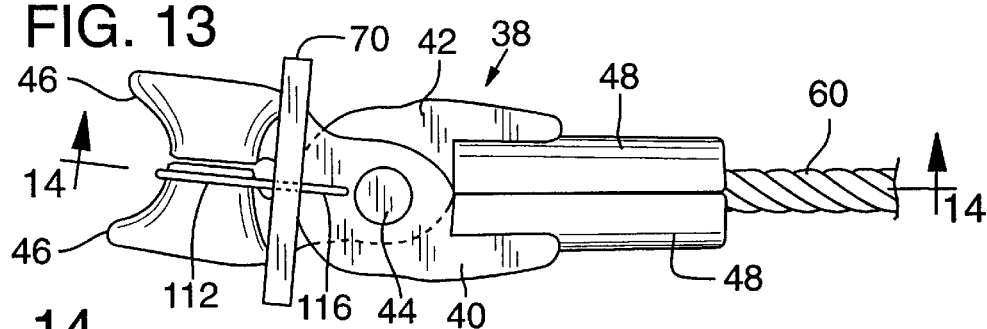
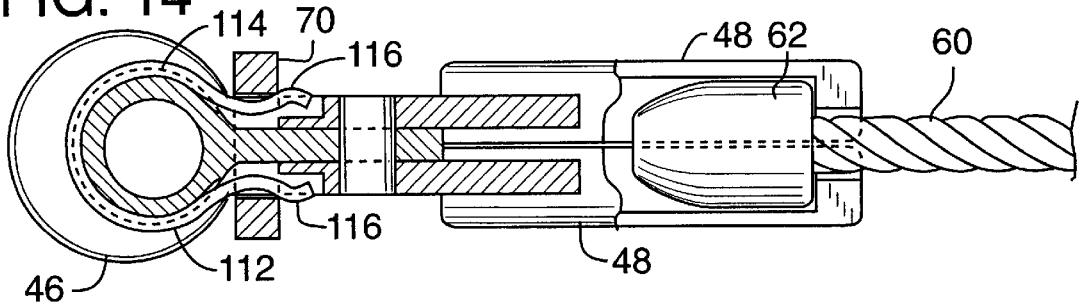
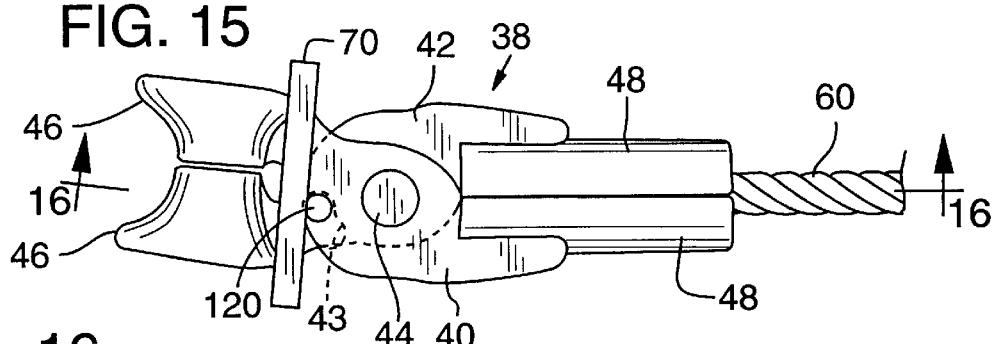
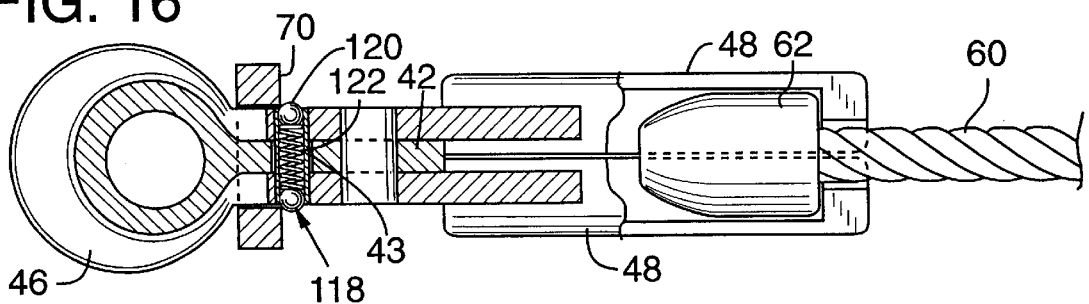

SELF-RELEASING LOG CHOKER

FIELD OF THE INVENTION

This invention relates to the transporting of logs from the falling site to a landing and more particularly it relates to the choker which attaches to the log and enables the log to be dragged or airlifted to the landing.

BACKGROUND OF THE INVENTION

The process or operation of logging from forests involves, e.g., timber cutters with chain saws moving through a designated logging site, often located on hillsides and remote from roadways, the cutter performing the task of falling trees and stripping the limbs from the trees (the fallen and stripped trees thereafter referred to as logs). Following behind the cutters are the log yarders that remove the logs from the forest floor and transfer the logs to trucks that haul the logs to lumber or pulp mills.

This invention relates to that stage of logging where the logs are transferred from the forest floor to a landing site from which the logs are loaded onto the trucks. Although motorized skidders are sometimes used, in rough terrain that is essentially impassable for vehicles, a skyline is more likely to be used. The description hereafter will be directed to the use of the invention for all yarders and skyline but as those skilled in the art will readily discern, it may apply to ground skidders or helicopter logging or other forms of log removal from the forest floor.

Skylines themselves are subject to variation but in general a boom (e.g., mounted on a mobile rig referred to as a yarder) is anchored at a position above the logging site and a cable referred to as a skyline is extended off a drum on the yarder, through guide rollers on the end of the boom and then down to a tail tree or stump (or other form of suitable anchor) that is positioned below or above the logging site. Enough tension is applied to maintain the skyline suspended off the ground. A carriage is mounted to the skyline for travel along the length of the skyline and a second cable referred to as a mainline controls travel of the carriage and includes an end or choker that is attachable to the logs. The mainline is wound onto and off of a second drum on the yarder (motorized and braked) and also extends through guide rollers on the end of the boom to the carriage. As will be hereafter explained, the mainline controls the positioning of the carriage along the skyline, i.e., over the logging site, and further controls provide movement of the mainline relative to the carriage for lowering and raising the end of the mainline relative to the logs on the forest floor below the carriage.

The carriage is first moved down or up the skyline, e.g., by gravity or a receding line, to a desired position over the logging site and then locked in place. The mainline is extended down from the carriage and manually connected with chokers to one or more (e.g., often up to seven or eight) log ends. The mainline is then reeled in by the second drum to first raise the log ends and drag the logs to a position under the carriage, and then through manipulation of the controls, the carriage and logs are dragged up the hill to the landing area where the logs are manually released from the mainline. Log loaders remove the logs from the landing area, e.g., to load the logs onto trucks. The process is repeated until all of the logs along the vicinity of the skyline, i.e., between the anchor and the landing area, are removed from the logging site.

Typically a cycle, i.e., running the carriage and mainline down to the logging site, hooking onto a log or logs and running the logs back up to the landing area, may take, e.g., 15 minutes. In that period of time, choker setters have wrapped choker lines around the ends of selected logs at the logging site so that when the mainline reaches the site, the mainline is quickly secured to the chokers and the logs are carried off to the landing site. At the landing site, however, and only after the logs are lowered onto the landing, the chokers historically have had to be manually disconnected from the logs. One or more workers (referred to as chasers) have to hustle down to the landing, uncouple the chokers and move clear of the logs before the operator of the yarder can pull the mainline free of the landed logs and return it to the logging site. It is estimated that as much as 50% of the cycle time is expended in the uncoupling process.

BRIEF DESCRIPTION OF THE INVENTION

The objective of the present invention is to provide for automatic uncoupling of the choker from the logs upon placement of the logs at the landing site. The choker typically includes a length of cable, e.g., 12 feet or more in length with a knob on one end and a ring at the other end. A connector which is slidably secured to the cable and is free to slide on the cable between the two ends. The connector is adapted to connect to the knob. Thus, a choker setter encircles a log with the knob end of the cable and connects the knob to the connector which is slid on the cable to a position close to the log. A noose is thereby formed with the cable end encircling the log and when the ring end of the choker is pulled, the noose tightens on the log. The end of the mainline is adapted to fit through the ring of the cable end and connects to one or any number of chokers as will be explained in the detailed description.

The prior art connector (referred to as a bell connector) was essentially a sleeve with a restricted end opening (allowing passage of the cable and not the knob and a key-type slot in the side of the sleeve, the slot being connected to the end opening. An eyelet in the opposite end of the connector enables the connector to slide on the cable but remain connected to the cable. Connection requires that the knob be inserted into the enlarged end of the key slot and slid inside the sleeve along the slot to the end opening. The knob is thereby trapped inside the sleeve with the cable from the knob extended through the opening. Disconnecting the knob from the connector required first loosening the noose to obtain enough slack to slide the knob along the slot and away from the end opening and back to the enlarged opening of the key slot for removal of the knob from the connector.

The preferred embodiment of the present self-releasing connector is also a sleeve-like member with a restricted end opening and an eyelet at the other end. However, the connector sleeve is in two halves, the halves being pivotally connected in a manner like a pliers or scissors. An eyelet or eyelet portion is provided on each half of the sleeve (like the handle portion of a pliers or scissors) and pressing the two eyelets together presses the two sleeve halves together like the jaws of a pliers. A spring inside the sleeve between the two sleeve halves urges separation of the sleeve halves and a corresponding separation of the eyelets. The choker cable is threaded through both eyelets. As before, the knob is extended around the log end. Now, however, the knob is simply inserted into the opened end of the sleeve. The sleeve is manually clamped shut which traps the knob inside the sleeve (between the sleeve halves) the cable extending out the end opening (also formed in the two halves of the sleeve). A lock ring of special design is maneuvered by the choke setter to lock the connector halves together and thus to entrap the knob inside the connector.

When the mainline is connected to the choker ring and then tension applied by the mainline being reeled back up to the carriage and then to the landing area, the tension thus created draws the two eyelets tightly together, more tightly than as held by the lock ring (a specifically engineered relationship as will be explained). In response to this further tightening, the lock ring is maneuvered to an unlocked condition which would now allow the two sleeve halves to open except for the continued tension applied by the mainline keeping the eyelets and sleeve halves closed. This tension is continued until the logs are transported to the landing. As the logs are laid onto the landing, the tension is released, the lock ring is unlocked and the sleeve halves separate and the knob is released.

The choker lines are simply pulled free of the logs and the entire unloading process is completed without manual involvement (of a chaser) in the uncoupling process. The time expenditure is dramatically reduced and a major hazard to workers/chasers previously involved in releasing the chokers is eliminated. In the event manual release is desirable (e.g., when dragging logs over obstacles that cause release of the tension) a secondary locking member may be provided to lock the ring in place which then requires manual uncoupling.

The invention and its advantages over the prior art will be further appreciated upon reference to the following detailed description having reference to the drawings.

BRIEF DESCRIPTION OF THE DRAWINGS

FIG. 6 is a perspective view of the connector of FIG. 2 in the open position;

FIG. 7 is a perspective view of the connector of FIG. 4 in the closed and locked position;

FIG. 11 is a view of the secondary locking member preventing automatic release of a log;

FIGS. 12–14 illustrate another secondary locking member preventing automatic release of a log; and, FIGS. 15, 16 illustrate another secondary locking member preventing automatic release of a log.

DESCRIPTION OF THE PREFERRED EMBODIMENT

Figure 1:
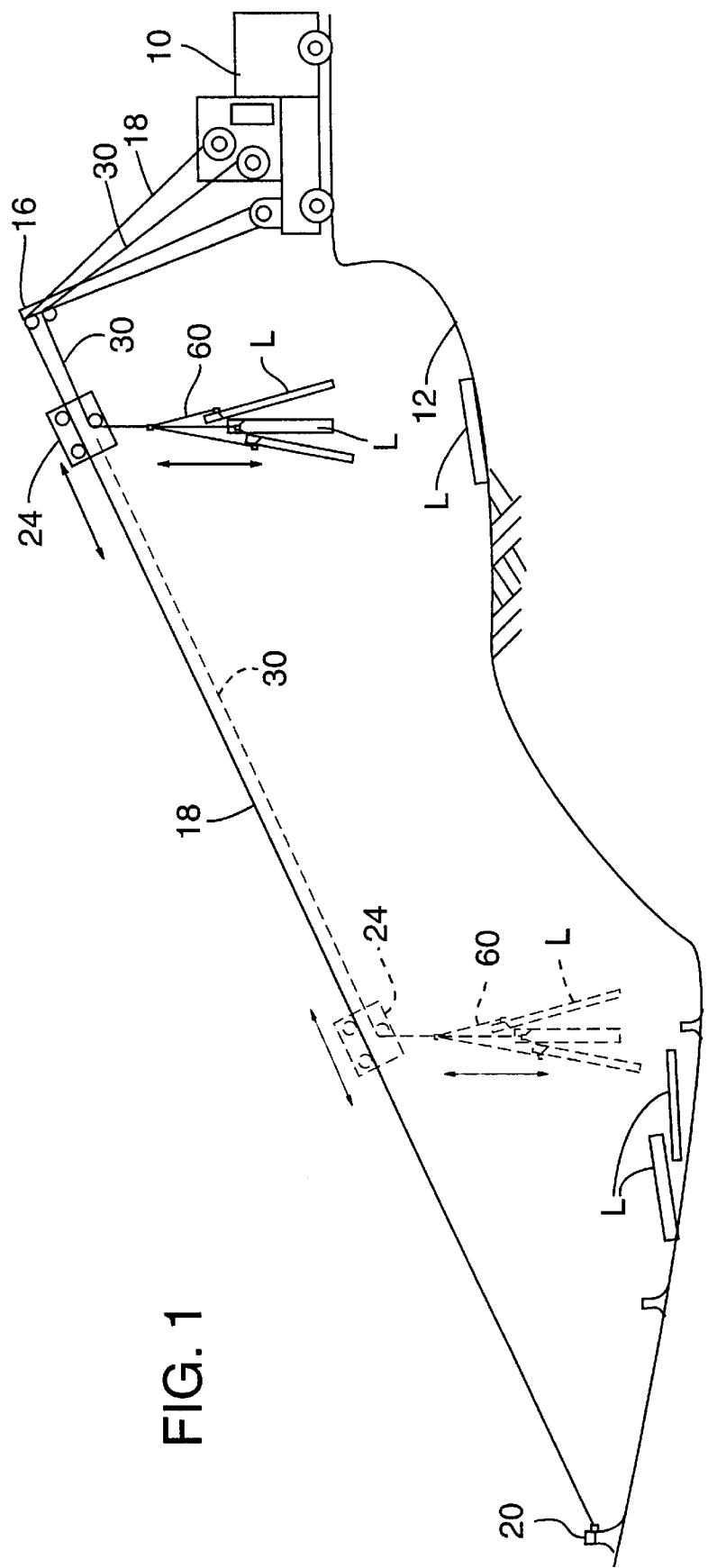
FIG. 1 is a view illustrating a typical arrangement for transporting logs to a landing area.

FIG. 1 illustrates a typical setup for retrieving logs from the forest floor at a logging site and transporting them to a landing area where they may be transported for further processing. This arrangement is most often utilized in hilly or mountainous terrain where there are steep slopes that are not navigable by land land vehicles such as skidders or tractors.

As shown an apparatus such as a yarder 10 is positioned near a landing area 12. In this embodiment the yarder 10 has an extending boom 16 that supports a cable-type skyline 18 that extends down the slope to an anchor 20. The anchor 20 is positioned beyond a felling or gathering area of the logs L to be retrieved. The anchor 20 is often a large stump or another piece of heavy equipment that will withstand the forces applied to the skyline 18 extended between the boom 16 and the anchor 20. The skyline 18 is typically a strong cable sufficient to support a movable carriage 24 and the weight of the material that will be elevated and moved by the carriage to the landing area 12. Carriage 24 is movable along the skyline cable 18. A mainline cable 30 extends from the yarder 10 via boom 16 and is supported by and extendable through the carriage 24. The carriage 24 is of the type that is adjustably movable along the skyline cable 18 and may be locked or unlocked in any position along the skyline cable 18. Further the mainline cable 30 is lockable and un-lockable to the carriage 24. Typically when the carriage 24 is locked to the skyline 18, the mainline cable 30 is unlocked from the carriage 24 and when the carriage 24 is unlocked from the skyline 18 the mainline cable 30 is locked to the carriage 24. When the mainline 30 is unlocked from the carriage 24, the mainline cable may be deployed or retracted through the carriage 24 by the yarder 10.

When the carriage 24 is unlocked from the skyline cable 18, the carriage 24 will descend down the skyline cable 18 towards the anchor 20 by gravity upon deployment of the mainline cable 30 from the yarder 10. The yarder 10 has a spooling device that will play out or retrieve the length of the mainline cable 30 as desired. As the carriage 24 is descending along the skyline cable 18 the mainline cable 30 will be deployed from the yarder 10 such that the mainline cable 30 will be extended along with the carriage 24. When the carriage 24 is in a desired position along the skyline cable 18, carriage 24 is locked to the skyline cable 18 and the mainline cable 30 is unlocked from the carriage 24.

When the carriage 24 is locked into position on the skyline cable 18, an additional length of the mainline cable 30 may be extended through the carriage 24 so that an end of the mainline cable 30 will extend to the area where logs L are to be retrieved. Lengths of cables referred to as chokers 60 are attached to individual logs and each of the chokers 60 are in turn attached to the mainline cable 30.

The yarder 10 will retrieve a length of the cable 30 until the connected ends of the logs have been elevated off of the surface of the ground. (The logs may be completely lifted off the ground as illustrated but more likely will be elevated as required for dragging the logs along the ground whereby the weight of the logs is not totally carried by the skyline.) The carriage 24 is then unlocked from the skyline cable 18 and the carriage 24 is locked to the mainline cable 30. Further retrieval of the mainline cable 30 by the yarder 10 thus will force the carriage 24 to move upwardly on the skyline 18 toward the boom 16 of the yarder 10 and in the process will transfer the logs held by the chokers 60 to the landing area 12. When the logs are above the landing area 12 the carriage 24 is again locked to the skyline cable 18 and the mainline cable 30 is unlocked from the carriage 24. The yarder 10 will then deploy a length of cable 30 to lower the logs onto the landing area 12.

It will be appreciated that the self-releasing log choker will also work equally well with other designs of mobile spars, towers and yarders. The self-releasing log choker also works well with the many varied carriage designs.

Prior connecting devices required that a worker/chaser or a number of chasers be at the landing area 12 to disconnect the chokers 60 from the logs L deposited on the landing area 12. This was a time consuming and often a dangerous operation for the individuals that had to disconnect the chokers from the logs. The present invention provides a connector that is self releasing and eliminates the need of manually disconnecting the choker from the logs at the landing area 12.

Figure 10:
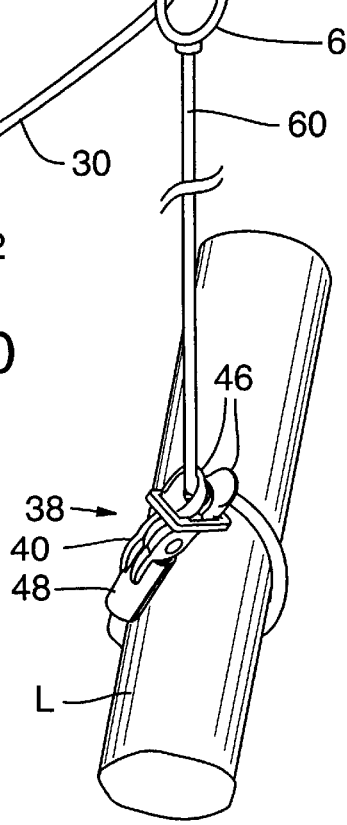
FIG. 10 is a view illustrating the connector coupled to the end of the choker and the choker connected to a skyline cable.

FIGS. 2 through 7 illustrate the self releasing connector (clamp member) 38 that is utilized on the log chokers 60 and are arranged to automatically release the end of the choker such that the chokers may be simply withdrawn from the logs deposited on the landing area 12 of FIG. 1. Connector 38 is a jaw type unit that has jaws 40, 42 that are pivotally connected by a pivot pin 44. Each jaw 40, 42 is extended rearwardly of the pivot pin 44 and formed into eyelets 46 with the eyelets 46 being arranged to receive a choker cable 60. The choker cable 60 is slidably movable in the eyelets 46 of the jaws 40, 42. The eyelets 46 are of sufficient size such that the choker cable 60 will readily slide in the eyelets 46 yet the eyelets 46 are small enough in diameter such that a knob 62 affixed to the end of the choker cable 60 will not pass through the eyelets 46. As seen in FIG. 10, the opposite end of the choker cable 60 has a ring 64 attached and the ring 64 is also too large to pass through the eyelets 46.

Figure 3:
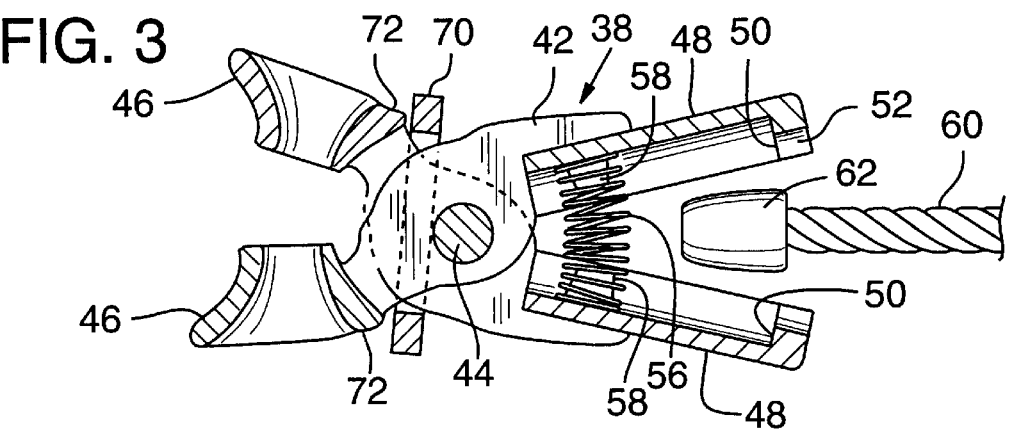
FIG. 3 is a sectional view similar to FIG. 2.
Figure 4:
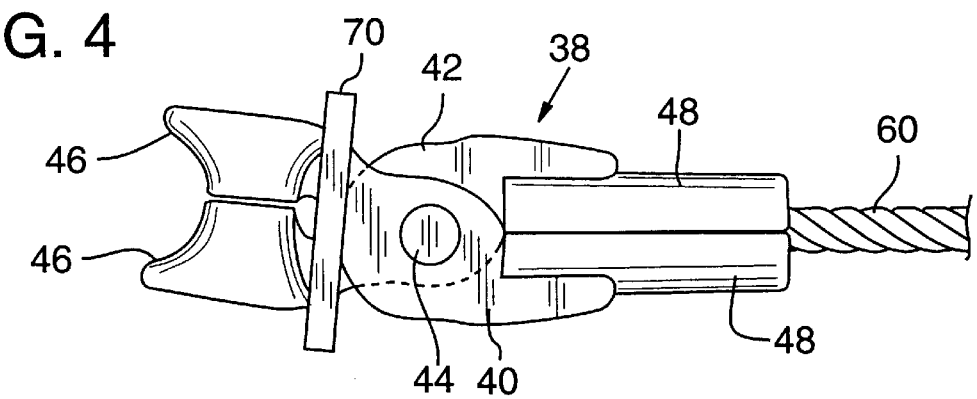
FIG. 4 is a view of the connector of FIG. 3 shown in the closed and locked position.
Figure 5:
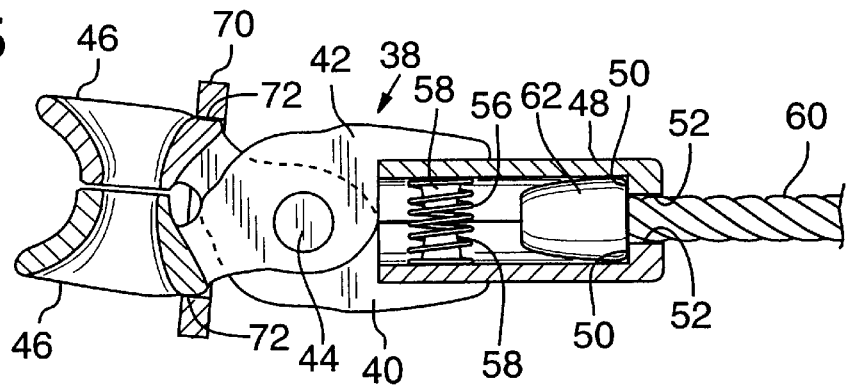
FIG. 5 is a sectional view of the connector of FIG. 4.

The ends of the jaws 40, 42 opposite the eyelets 46 are provided with or shaped into semi-cylindrical members 48. The semi-cylindrical members 48 are fixedly attached to or integral with the jaws 40, 42 and extend a sufficient distance to receive the knob 62 of the choker cable 60. As seen in FIGS. 3 and 6 each semi-cylindrical member 48 has a semi-circular shoulder 50 at or near the extending end of the semi-cylindrical member 48. The semi-circular shoulder 50 forms a semi-circular opening 52. A spring 56 is fitted between the semi-cylindrical portions 48 on pins 58 to normally force the semi-cylindrical portions 48 to pivot away from each other on the pivot pin 44 and simultaneously the eyelets 46 extended on each of the jaws 40, 42 will be pivoted away from each other. The spring 56 is compressible such that the semi-cylindrical jaws 48 may be moved into abutment with each other as best seen in FIGS. 4, 5 and 7. When the semi-cylindrical portions 48 are pivoted into abutment with each other, a cylindrical shape will be formed. The semi-circular openings 52 will form a circular opening of sufficient size to receive the choker cable 60 however the knob 62 on the end of the choker cable is too large to pass through the circular opening. The knob 62 will be in abutment with the shoulders 50 of the semi-cylindrical portions 48.

Figure 2:
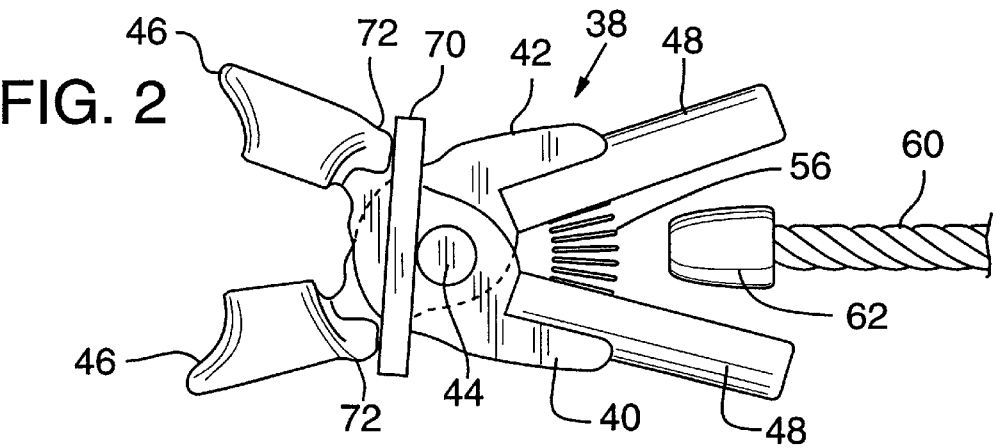
FIG. 2 is a view of a self releasing connector shown in the open position.

A lock ring (holder) 70 is positioned to surround the jaws 40, 42 adjacent the eyelets 46. As seen in FIGS. 2 and 3 the ring 70 is at a position whereat the spring 56 is allowed to pivot the jaws 40, 42 to an open position. That is, the semi-cylindrical portions 48 are pivoted away from each other and similarly the eyelets 46 are pivoted away from each other. A flat portion 72 which is adjacent each of the eyelets 46 of the jaws 40, 42 are arranged to receive the lock ring 70 when the jaws 40, 42 are pivoted towards each other as illustrated in FIGS. 4, 5 and 7 (referred to as the closed position) and will thus retain the jaws 40, 42 in the closed position. The lock ring 70 when positioned on the flat 72 is retained in position by the force of the biasing spring 56 urging the pivoting of the jaws 40, 42 to an open position.

Figure 8:
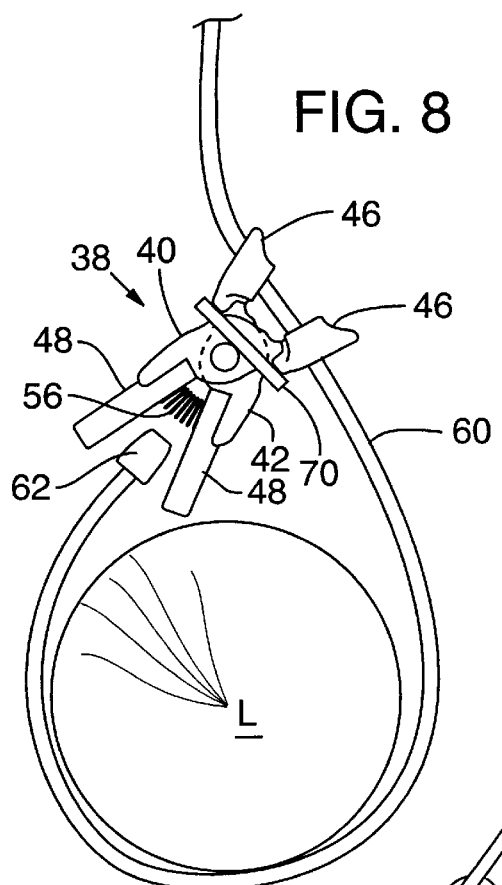
FIGS. 8 and 9 illustrate in sequence a choker of the present invention secured to a log and in reverse order, the choker being released from a log.
Figure 9:
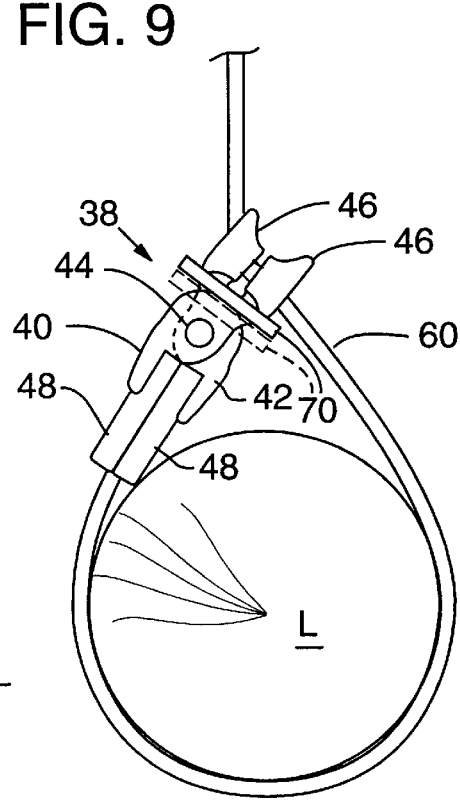

A worker referred to as a choker setter will attach the choker 60 to a log L as illustrated in FIGS. 8 and 9. As shown, the choker cable 60 extends through the eyelets 46 of the connector 38 and a sufficient length of cable 60 is extended through the eyelets 46 so that the cable 60 may be wrapped around the log L and the end (62) of the cable 60 attached to the connector 38. As shown in FIG. 8, the connector 38 is in the opened position and the knob 62 is positioned between the semi-cylindrical members 48. With the knob 62 inserted between the semi-cylindrical members 48, the jaws 40, 42 are pivoted to a closed position as illustrated in FIG. 9. While holding the jaws 40, 42 in the closed position, the lock ring 70 is moved onto the flat 72 to thus hold the connector 38 in its closed position. This is repeated for a number of logs L with a choker 60 being attached to each of the logs.

As viewed in FIG. 10, the mainline cable 30 is inserted through each ring 64 of the choker cable 60. The mainline cable 30 has a known T end 32 that is insertable through the ring 64, yet when pivoted the ring 64 will not slip off the T portion 32. When the individual chokers 60 have been attached to the mainline cable 30, the yarder 10 will retrieve the mainline cable 30 and thus the end of the logs L attached by the chokers 60 will be elevated off the ground. This, of course, creates tensions in the choker cable 60 and as the tension is applied by the choker cable 60, the cable 60 sliding and acting upon the eyelets 46 will urge a further closing of the jaws 40, 42 of the connector 38. As the jaws 40, 42 are further closed by this action, the lock ring 70 will be free to simply fall off the flat 72 by gravity. (See the dash line position in FIG. 9.)

When the logs L have been elevated to a desired elevation by the retrieval of the mainline cable 30, the main line cable 30 is locked to the carriage 24 and the carriage 24 is unlocked from the skyline line 18. Further retrieval of the mainline cable 30 will thus force the carriage 24 toward the boom 16 of the yarder 10. When the logs have been retrieved to the desired position at the landing area 12, the carriage 24 is again locked to the skyline 18 and the mainline cable 30 is unlocked from the carriage 24. The mainline cable 30 is then deployed through the carriage 24 by extending cable from the yarder 10 and thus the logs L will be deposited on the landing area 12. The dropping of the logs upon the landing area 12 and the release of the tension on the choker cable 60 will permit the biasing spring 56 to pivot the jaws 40, 42 to an open position (from the position of FIG. 9 to the position of FIG. 8) to thus release the knob 62 of the choker cable 60. The mainline cable 30 is then retracted by the yarder 10 and the mainline cable 30 will pull the choker cables 60 away from the logs L.

The logs L are accordingly deposited on the landing area 12 without the necessity of an individual uncoupling the connectors 38. The choker cables 60 are thus still retained on the mainline 30 and the yarder will simply retract the mainline 30 until the choker cables are free of the logs L. The mainline cable 30 will then be locked to the carriage 24 and the carriage 24 will be unlocked from the skyline 18. The carriage 24 will then descend by gravity down toward the retrieval area and simultaneously a length of the mainline cable 30 will be deployed and the process is repeated to retrieve additional logs.

There are occasions when it is desirable to provide a retaining device that will maintain the lock ring 70 in the locked position. As previously mentioned when tension is applied to the cable of the choker 60, the ring 70 is free to fall off the locked position. There are situations when the skyline 18 is transporting logs up an incline, the free ends of the logs will be encountering stumps, uneven terrain and the like to cause the cable of the choker 60 to lose its tension. When this occurs, the spring 56 will open the jaws 40, 42 to release the end 62 of the choker 60 and the choker 60 will release the log.

FIGS. 12–14 illustrates a retaining device such as a spring 112. The spring 112 is removably mounted in a groove 114 provided on one of eyelets 46. The spring 112 is shaped to be self retaining in the groove 114 yet may be readily removed when desired. The ring 70 is slid up over a tapered portion 116 of the spring 112 with the tapered portion engaging the bottom side of the ring 70. The tapered portion of the spring 112 will retain the ring 70 in the locked position even when tension is released on the cable of the choker 60. The ring 70 will however slide off the spring 112 when the log L (secured by the choker 60) is forcibly dropped. The ring 70 may also be manually moved off of the locked position to thus permit the jaws 40, 42 to open to release the end 62 of the choker 60.

FIGS. 15, 16 illustrates another device to retain the lock ring 70 in the locked position. A cartridge 118 having spring biased balls 120 is mounted to the jaw 40 in a conventional manner. The jaw 42 has a slot 43 to avoid interference with the ball assembly. The balls are biased outward by a spring 122. Each ball 120 is positioned such that when the ring 70 is in the locked position the ball 120 will engage the underside of the ring 70 to maintain the ring 70 in the locked position. The ball 120 will maintain the ring 70 in position even when the cable of the choker 60 loses its tension. The ring 70 will slide down over the ball 120 when the log L retain by the choker 60 is forcibly dropped. The ring 70 may also be manually moved from the locked position to the unlocked position.

FIG. 11 illustrates another locking device for the ring 70. In this embodiment jaw 40 near the eyelets 46 has holes 100 drilled to a sufficient depth to receive extending tabs 104 of a tapered wedge 102. The wedge 102 preferably is of a resilient material that will compress. The tabs 104 frictionally fit in the bored holes 100 to hold the wedge 102 on the jaw 40. When the connector is in the closed position and the ring 70 is forced up onto the flats 72, the ring will force compression of the wedge. The wedge 102 will frictionally engage the ring 70 to retain the ring 70 even when the tightening of the choker cable 60 forces the jaws 40, 42 to close further to normally release the ring 70. The tapered wedge will prevent the ring 70 from sliding off of the flats 72 even though the flats 72 no longer engage the ring 70 sufficiently to retain the ring 70 in position. When the wedge is utilized, the connector 38 may be manually disconnected from the logs by forcibly moving the ring 70 off of the flats 72 and the wedge 102. The forcible dropping of the logs L attached to the choker 60 will also release the connector 38.

It will be appreciated that other locking devices may be provided to perform the same function as the spring 112, the biased ball 120 or the wedge 102.

Those skilled in the art will recognize that modifications and variations may be made without departing from the true spirit and scope of the invention. The invention is therefore not to be limited to the embodiments described and illustrated but is to be determined from the appended claims.

We claim:

1. A connector for a log choker including an elongated cable-like member adapted to encircle a log, one end of the cable-like member fitted with a knob and the other end fitted with a mainline connection, said connector comprising:

a clamp member having movable jaw portions defining jaws that open and close and an interconnect portion for slidable connection to the cable-like member, said knob inserted between the opened jaws with the cable-like member encircling the log, said jaw portions pivotally connected together and when closed form a sleeve-like body having an inner cavity and a closed end having an opening for passage there through of the cable-like member and not the knob, and the interconnect portion being extensions of the jaw portions and forming a pair of eyelets that move toward and away from each other as the jaws close and open, respectively, in scissor-like fashion, the eyelets slidably receiving the cable-like member of the choker and the eyelets being forced together by the cable-like member upon application of tension to the cable-like member, said movable jaw portions responsive to relief of said tension as applied to the cable-like member to open the jaws; and said jaws subject to manual closing, and a holder for holding the laws closed until tension is applied to the interconnect portion.

2. A connector as defined in claim 1 including an expansion spring between the jaws to urge separation of the jaws upon release of tension applied to the eyelets.

3. A connector as defined in claim 2 wherein the holder is a lock ring that slides between a first position adjacent the pivotal connection and a second position located on the extensions of the jaw portions at which position the jaws are prevented from opening and from which position gravity will cause the lock ring to slide to the first position upon application of tension and lifting of the log.

4. A connector as defined in claim 3 including a secondary locking member applied to the lock ring for securing the lock ring in the second position.

5. A connector as defined in claim 4 wherein the secondary locking member is a spring biased and removable member interfit with the lock ring requiring manual movement of the lock ring until the secondary locking member is removed.

6. A connector as defined in claim 3 wherein the lock ring allows some separation of the eyelets when in the second position but still maintaining the jaws in a sufficiently closed position to prevent removal of the knob, said separation of the eyelets being further closed upon application of tension by the cable-like member whereby the lock ring is freed to slide back to the first position.

* * * * *